US009824637B2

(12) United States Patent
 de Greef

(10) Patent No.: US 9,824,637 B2
(45) Date of Patent: Nov. 21, 2017

(54) REDUCING VISUAL ARTIFACTS AND REDUCING POWER CONSUMPTION IN ELECTROWETTING DISPLAYS

(71) Applicant: Amazon Technologies, Inc., Seattle, WA (US)

(72) Inventor: Petrus Maria de Greef, Waalre (NL)

(73) Assignee: AMAZON TECHNOLOGIES, INC., Seattle, WA (US)

(*) Notice: Subject to any disclaimer, the term of this patent is extended or adjusted under 35 U.S.C. 154(b) by 65 days.

(21) Appl. No.: 14/954,466

(22) Filed: Nov. 30, 2015

(65) Prior Publication Data
 US 2017/0154583 A1  Jun. 1, 2017

(51) Int. Cl.
 *G09G 3/34* (2006.01)
 *G02B 26/00* (2006.01)

(52) U.S. Cl.
 CPC ......... *G09G 3/3406* (2013.01); *G02B 26/005* (2013.01); *G09G 3/348* (2013.01); *G09G 2300/08* (2013.01); *G09G 2310/061* (2013.01); *G09G 2320/0233* (2013.01); *G09G 2320/0257* (2013.01); *G09G 2320/045* (2013.01); *G09G 2320/0626* (2013.01); *G09G 2360/145* (2013.01)

(58) Field of Classification Search
 CPC .. G09G 3/3406; G09G 3/348; G09G 2300/08; G09G 2310/061; G09G 2320/0233; G09G 2320/0257; G09G 2320/045; G09G 2320/0626; G09G 2360/145; G02B 26/005
 See application file for complete search history.

(56) References Cited

U.S. PATENT DOCUMENTS

| | | | |
|---|---|---|---|
| 2007/0279369 A1* | 12/2007 | Yao ...................... | G09G 3/3406 345/102 |
| 2011/0013048 A1* | 1/2011 | Wei ........................ | G06T 5/009 348/234 |
| 2012/0218312 A1* | 8/2012 | Goldsmith ........... | G09G 3/3406 345/690 |
| 2012/0281027 A1* | 11/2012 | Kim ..................... | G09G 3/3406 345/690 |

(Continued)

FOREIGN PATENT DOCUMENTS

WO   WO 2015/064741 A1   5/2015

OTHER PUBLICATIONS

International Search Report and Written Opinion from corresponding International application No. PCT/US2016/063852, 17pp., dated Mar. 6, 2017.

*Primary Examiner* — Dmitriy Bolotin
(74) *Attorney, Agent, or Firm* — Brinks Gilson & Lione

(57) ABSTRACT

A device, such as an electrowetting display device, includes a first substrate and a second substrate opposite to the first substrate. A pixel region is on the first substrate. The device includes an input line for applying a driving voltage to a capacitor associated with the pixel region to control a luminance of the pixel region, wherein, after the driving voltage is applied to the capacitor, the pixel region exhibits a reduction in a luminance of the pixel region over time. An illumination device is configured to illuminate at least a portion of the pixel region. A timing controller is configured to modify an output of the illumination device to compensate for the reduction in the luminance of the pixel region over time.

19 Claims, 10 Drawing Sheets

(56) References Cited

U.S. PATENT DOCUMENTS

2014/0139507 A1 5/2014 Myoung-Hoon
2016/0284281 A1* 9/2016 Suyama ............... G09G 3/3406
2016/0284284 A1 9/2016 Tatsuhiko

* cited by examiner

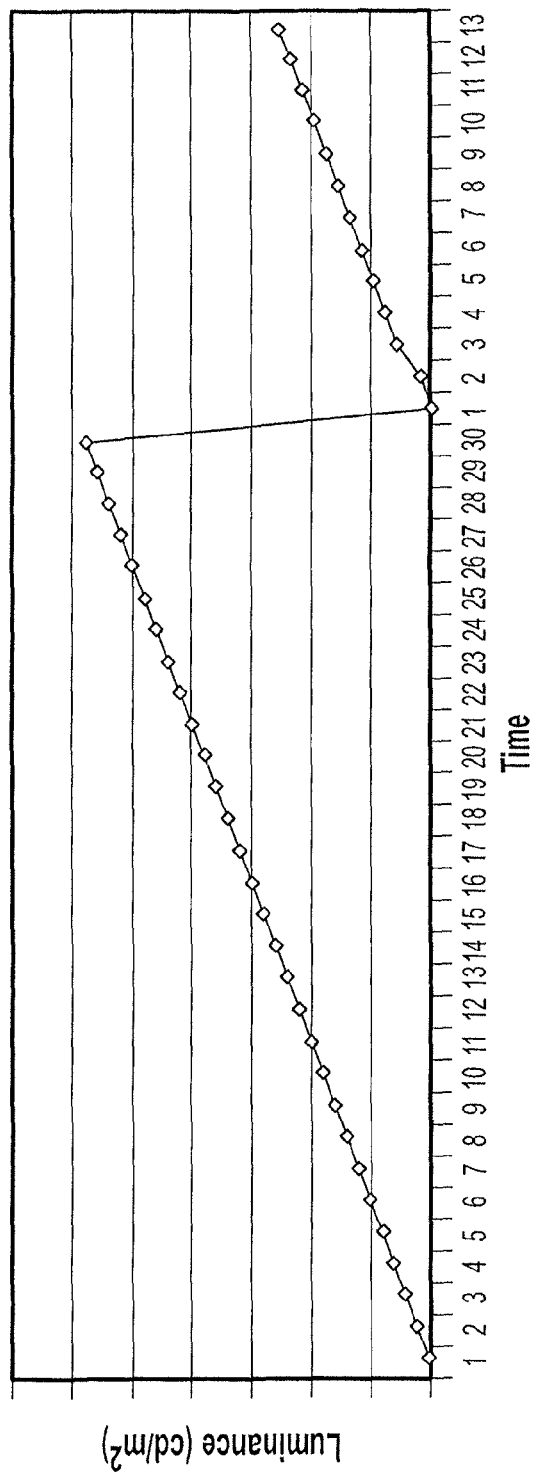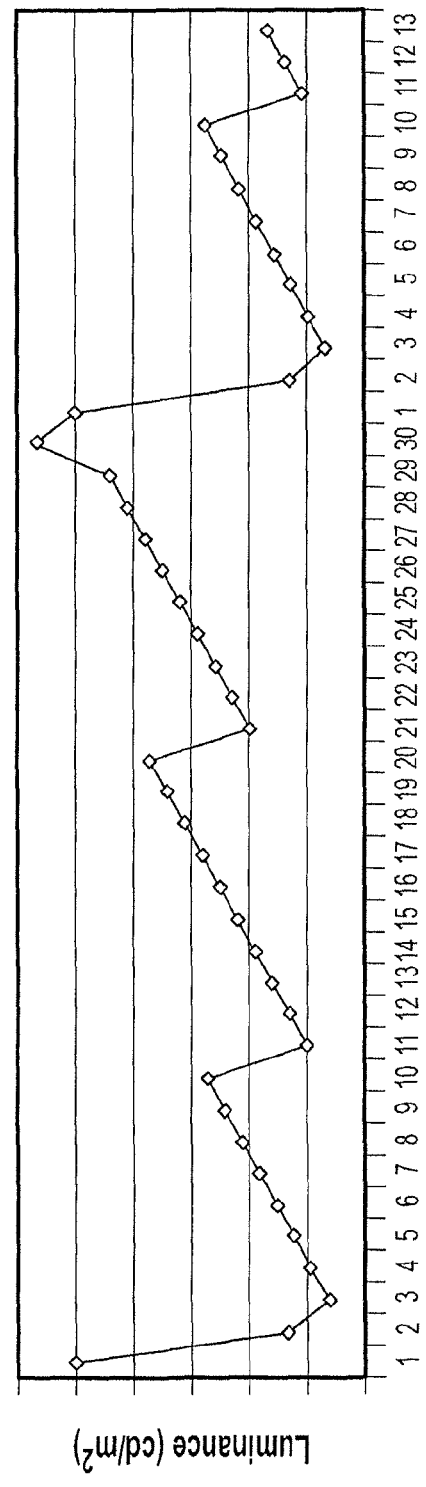
FIG. 4C
FIG. 5A

REDUCING VISUAL ARTIFACTS AND REDUCING POWER CONSUMPTION IN ELECTROWETTING DISPLAYS

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, an addressing scheme is utilized to drive the pixels of the EWD. Generally, one of the points of emphasis for EWD applications is low power design since in today's applications EWDs are often intended to be used in mobile and portable media devices.

An input video or data-stream generally represents a sequence of pixel display values, grouped per line; a sequence of lines, grouped per frame; and a sequence of frames defining a frame sequence. When such a data stream is to be reproduced on an active matrix EWD, a timing controller and display drivers are used to process the incoming data-stream to control the actual pixels of the EWD. A specific addressing scheme is used by the timing controller to timely control row and column drivers of the EWD. The purpose of an addressing scheme is to set (or maintain) the state of a pixel. The addressing scheme drives an active matrix transistor array and provides analog voltages to individual pixels of the EWD. These voltages modulate the luminance transmission and/or reflectivity of the pixels of the EWD. The pixels are grouped per row and when a row is addressed, voltages of a complete row are stored as charge on corresponding pixel capacitors. As the display-data is repeatedly updated, still and moving images can be reproduced by the EWD.

Once a pixel is set to a particular display state, however, over time, the pixel's brightness or luminance will gradually diminish. Leakage of charge from the pixel's capacitor, for example, can reduce pixel luminance. Such leakage may result from current flow through active matrix switches and dielectric materials. Additionally, even without such a reduction in pixel capacitor charge, the fluids contained within the pixel can experience a phenomena referred to as backflow, in which the fluids tend to return to their original resting positions (i.e., with no charge applied to the pixel's capacitor). This also can cause a reduction in pixel luminance. In an attempt to mitigate these problems, the display's timing controller may periodically reset each pixel. If the pixels are reset very frequently, however, the image quality can be reduced and the power consumption may increase. Accordingly, in most displays the frequency with which pixels are reset is reduced. But, at a sufficiently low frequency, the pulses may be noticed by an observer as periodic reductions in brightness. These temporary reductions of display device luminance may cause visual image artifacts.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIGS. 4A-4C are graphs illustrating output variations for an illumination device configured to offset pixel luminance reductions FIGS. 5A-5B are graphs illustrating illumination device compensation schemes to compensate for variations in pixel luminance in a display device.

DETAILED DESCRIPTION

Figure 1A:
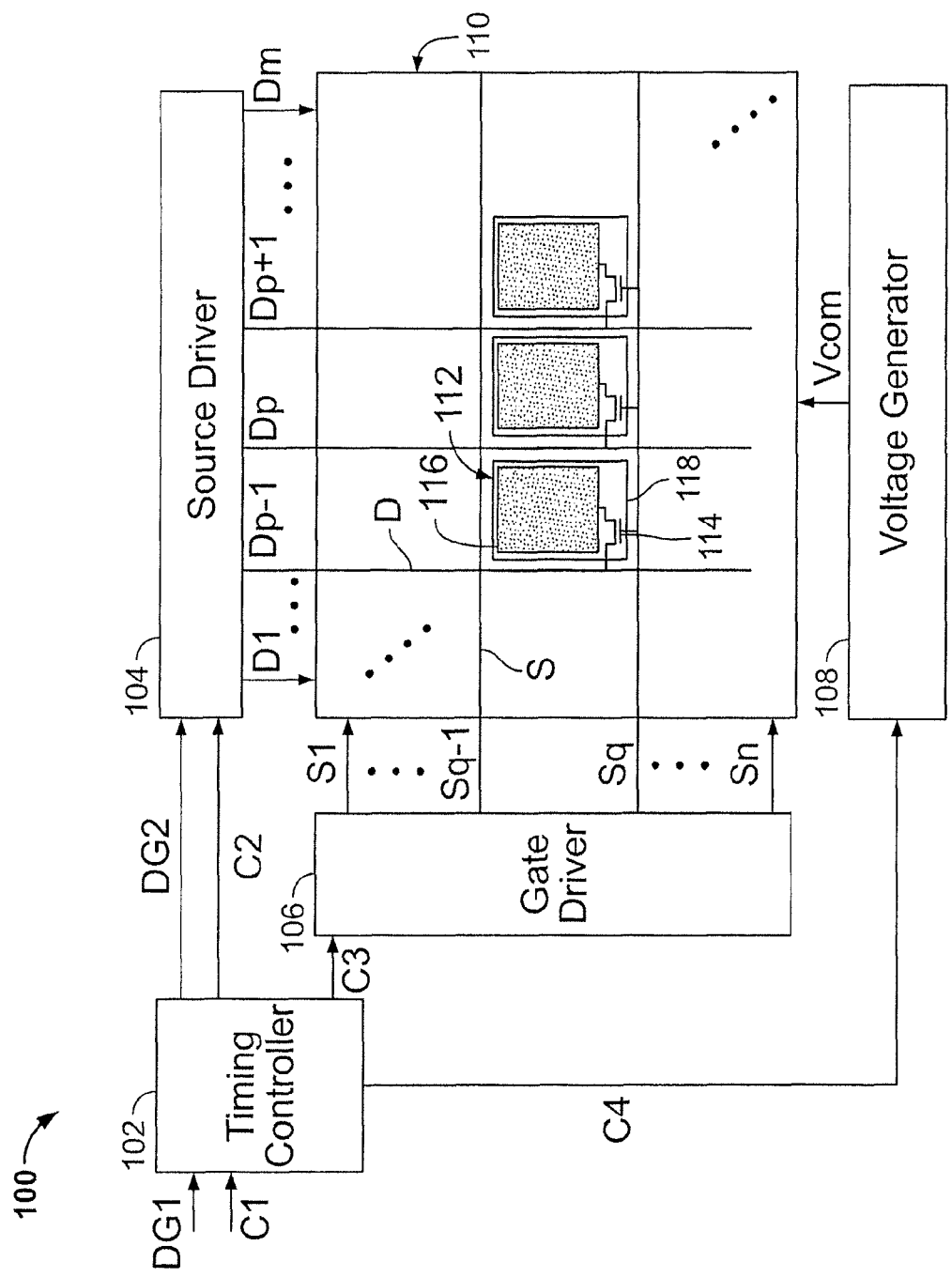
FIG. 1A is a schematic view of an example of an electrowetting display device, according to various embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, and a front light or back light component for lighting the electrowetting display. In the case of a transmissive electrowetting display, a back light may be positioned on or over a rear surface of the display. When activated, the back light causes light to pass through the open pixels of the display to increase a viewer's perceived brightness of the display. Conversely, if the display is implemented as a reflective electrowetting display, a front light may be positioned on or over a front surface of the display and configured to cause light to strike a viewing surface of the display. That light will then be reflected out of open pixels to a viewer again increasing the viewer's perceived brightness of the display.

An electrowetting pixel is surrounded by a number of pixel walls. The pixel walls form a structure that is configured to contain at least a portion of a first liquid, such as an opaque oil. Light transmission through the electrowetting pixel can be controlled by application of an electric potential or driving voltage to the electrowetting pixel, which results in a movement of a second liquid, such as an electrolyte solution, into the electrowetting pixel, thereby displacing the first liquid.

For a reflective EWD, when the electrowetting pixel is in a resting state (i.e., the closed or off-state, with no electric potential applied), the opaque oil is generally distributed throughout the pixel. The oil absorbs light and the pixel in this condition appears dark. But when the pixel is in the active state (i.e. the at least partially open state—the on-state—with an electric potential applied), the electrolyte solution starts displacing the oil so that the oil is no longer covering the whole pixel area. Light can then enter the pixel and strike a reflective surface that would otherwise be obscured by the opaque oil. The light then reflects out of the pixel, causing the pixel to appear less dark, e.g. white, to an observer. If the reflective surface only reflects a portion of the light spectrum or if color filters are incorporated into the pixel structure, the pixel may appear to be grey or have color.

The degree to which the oil is displaced from its resting position affects the overall luminance of the pixel—the pixel's capability to reflect or transmit light—and, thereby, the pixel's appearance. In an optimal display device, the driving voltage for a particular pixel results in a predictable luminance value for that pixel that is maintained over time, enabling the overall luminance of the display device to be precisely and predictably controlled.

In implementations, however, electrowetting display pixels set at a particular driving voltage may gradually lose luminance over time. Leakage of charge from the pixel's capacitor, for example, can reduce pixel luminance over time. Leakage may result from current flow out of the capacitor and through active matrix switches coupled to the capacitor as well as the dielectric materials making up the capacitor, for example. Additionally, even without a reduction in pixel capacitor charge, the fluids contained within the pixel can experience a phenomena referred to as backflow, in which the fluids tend to return to their original resting positions even when the pixel is being subjected to a constant driving voltage, which may also reduce luminance. In an attempt to mitigate these backflow effects, the display's timing controller may periodically reset each pixel by temporarily driving each pixel with a sufficiently low voltage to temporarily close each pixel before again setting each pixel to the pixel's target driving voltage. The pixel reset process, therefore, can itself reduce pixel luminance while the pixel is being reset. The various reductions in luminance may be particularly noticeable to a user in low-power applications in which a refresh rate of the display device is reduced, for example, below 10 Hertz (Hz).

In the present system, the change in pixel luminance over time due to pixel capacitor leakage, backflow effects, and the reset process is first characterized for the display. In some cases, this may involve directly observing the change in luminance over time for one or more pixels of the display and generalizing that observed rate of change across all pixels of the display. In other cases, mathematical models could be used to predict the changes in pixel luminance over time. Once the change in pixel luminance over time is determined, a compensation scheme is determined in which the compensation scheme describes how the output of the device's back light or front light can be modified to offset or compensate for those changes in pixel luminance.

In one embodiment, the display device's timing controller is configured to selectively increase an output level of the device's back light and/or front light, referred to herein as an illumination device, of the electrowetting display. By modulating the output of the illumination device, the reduction in electrowetting pixel luminance, whether resulting from pixel capacitor leakage, backflow, or reset pulses, can be compensated for by a corresponding increase in output of the illumination device.

The present disclosure provides a number of examples of the present display device 100 in which the display device 100 is described as a reflective display device. It will be understood, however, that the devices and methods described herein are equally applicable to transmissive and transflective devices. As such, descriptions of methods or approaches for mitigating changes in a pixel luminance (in a reflective device) will be understood to be readily applicable to methods or approaches for mitigating changes in a pixel's transmission (in transmissive or transflective device). A pixel may, unless otherwise specified, comprise a single sub-pixel or a pixel that includes two or more sub-pixels of an electrowetting display device. Such a pixel or sub-pixel may be the smallest light transmissive, reflective or transflective element of a display that is individually operable to directly control an amount of light transmission through and/or reflection from the element. For example, in some implementations, a pixel may be a pixel that includes a red sub-pixel, a green sub-pixel, a blue sub-pixel and a white sub-pixel. In other implementations, a pixel may be a pixel that is a smallest component, e.g., the pixel does not include any sub-pixels.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective or transflective pixels or sub-pixels (referred to herein as pixels) configured to be operated by an active matrix addressing scheme. For example, rows and columns of pixels are operated by controlling voltage levels on a plurality of source lines and gate lines. In this fashion, the display device can produce an image by selecting particular pixels to transmit, reflect or block light. Pixels are addressed (e.g., selected) via source lines and gate lines that are connected to transistors (e.g., TFTs, used as switches) included in each pixel. Transistors take up a relatively small fraction of the area of each pixel. For example, the transistor can be located underneath the reflector in reflective displays.

Electrically, the pixel is a small capacitor with a layer of insulating optical material (e.g., liquid crystal material or electrowetting material) sandwiched between two substrates, wherein each substrate generally includes a transparent conductive indium tin oxide (ITO) layer. A switching current-passing characteristic of the transistor of the pixel prevents charge that is being applied to the pixel from draining between refresh cycles of the display's image.

An electrowetting display employs an applied voltage to change the surface tension of a liquid in relation to a surface. For instance, by applying a voltage to a hydrophobic surface via a pixel electrode in conjunction with a common electrode, the wetting properties of the surface can be modified so that the surface becomes increasingly hydrophilic. Hydrophobic generally refers to repelling water or polar fluids while hydrophilic generally refers to having an affinity for water or polar fluids. As one example of an electrowetting display, the modification of the surface tension by applying a voltage causes a fluid that includes an electrolyte, i.e. the polar fluid, in an electrowetting liquid in individual pixels of the display to adhere to the modified surface and thus, replace a colored electrowetting oil layer in individual pixels of the display. Thus, the electrowetting fluids in the individual pixels of the display responding to the change in surface tension act as an optical switch. When the voltage is absent, the colored electrowetting oil forms a continuous film within a pixel, and the color may thus be visible to a user of the display. On the other hand, when the voltage is applied to the pixel, the colored electrowetting oil is displaced and the pixel becomes reflective. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the low power consumption of electrowetting displays in general makes the technology suitable for displaying content on portable display devices that rely on battery power.

For driving of electrowetting displays, a dedicated gate scanning algorithm is generally implemented. In general, a first write action discharges a pixel to a reset level, e.g., a black level voltage, which is also referred to as a reset of the pixel. A second write action generally charges the pixel to an actual required display data value.

The power consumption of an electrowetting display depends on the electrowetting display's physical properties, as well as image content. The power consumption of an electrowetting display can be modeled as an array of capacitors (corresponding to each of the display's pixels), which are continuously charged and discharged with new image data. The most relevant parameters are capacitive load (of the pixels and the electrowetting display), drive voltage for the pixels and the addressing rate for the pixels. These parameters determine the rate and charge required to readdress the electrowetting display, according the formula $P=\Sigma_1^{height}\Sigma_1^{width}(a*f*C*V^2)$, where P represents power required for a display driver of the electrowetting display, height represents the number of rows of the pixels of the electrowetting display, width represents the number of columns of pixels of the electrowetting display, a represents an activity factor that depends on image content and generally corresponds to temporal activity of a source driver of the electrowetting display, f represents the frequency of addressing the pixels in the electrowetting display, C represents the capacitive load of the pixels and the electrowetting display, and V represents the voltage output by the display driver. In certain conditions, the display driver for the electrowetting display may consume too much energy for a given application.

Referring to FIG. 1A, an example of an electrowetting display 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106 and the voltage generator 108.

As an example of general operation of the electrowetting display 100, responsive to a first data signal DG1 and a first control signal C1 from an external image source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108.

The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . . Sq−1, Sq, . . . , Sn to the electrowetting display panel 110 in response to the third control signal C3.

The voltage generator 108 applies a common voltage Vcom to the electrowetting display panel 110 in response to the fourth control signal C4. Although not illustrated in FIG. 1A, the voltage generator 108 generates various voltages required by the timing controller 102, the source driver 104, and the gate driver 106.

Pixels 112 are positioned adjacent to crossing points of the data lines D and the gate lines S and thus are arranged in a grid of rows and columns. Each pixel 112 includes a hydrophobic surface (not illustrated in FIG. 1A), and a thin film transistor (TFT) 114 and a pixel electrode 116 under the hydrophobic surface. Each pixel 112 may also include a storage capacitor (not illustrated) under the hydrophobic surface. A plurality of intersecting partition or pixel walls 118 separates the pixels 112. Pixels 112 can represent pixels within the electrowetting display 100 or sub-pixels within the electrowetting display 100, depending upon the application for the electrowetting display 100.

The electrowetting display panel 110 includes m data lines D, i.e., source lines, to transmit the data voltages and n gate lines S, i.e., scan lines, to transmit a gate-on signal to the TFTs 114 to control the pixels 112. Thus, the timing controller 102 controls the source driver 104 and the gate driver 106. The timing controller 102 applies a second data signal DG2 and a second control signal C2 to the source driver 104; a third control signal C3 to the gate driver 106; and a fourth control signal C4 to the voltage generator 108 to drive the pixels 112. The gate driver 106 sequentially applies scan signals S1, . . . , Sq−1, Sq, . . . , Sn to the electrowetting display panel 110 in response to the third control signal C3 to activate rows of pixels 112 via the gates of the TFTs 114. The source driver 104 converts the second data signal DG2 to voltages, i.e., data signals, and applies the data signals D1, . . . , Dp−1, Dp, Dp+1, . . . , Dm to sources of the TFTs 114 of the pixels 112 within an activated row of pixels 112 to thereby activate (or leave inactive) pixel regions 112.

Figure 1B:
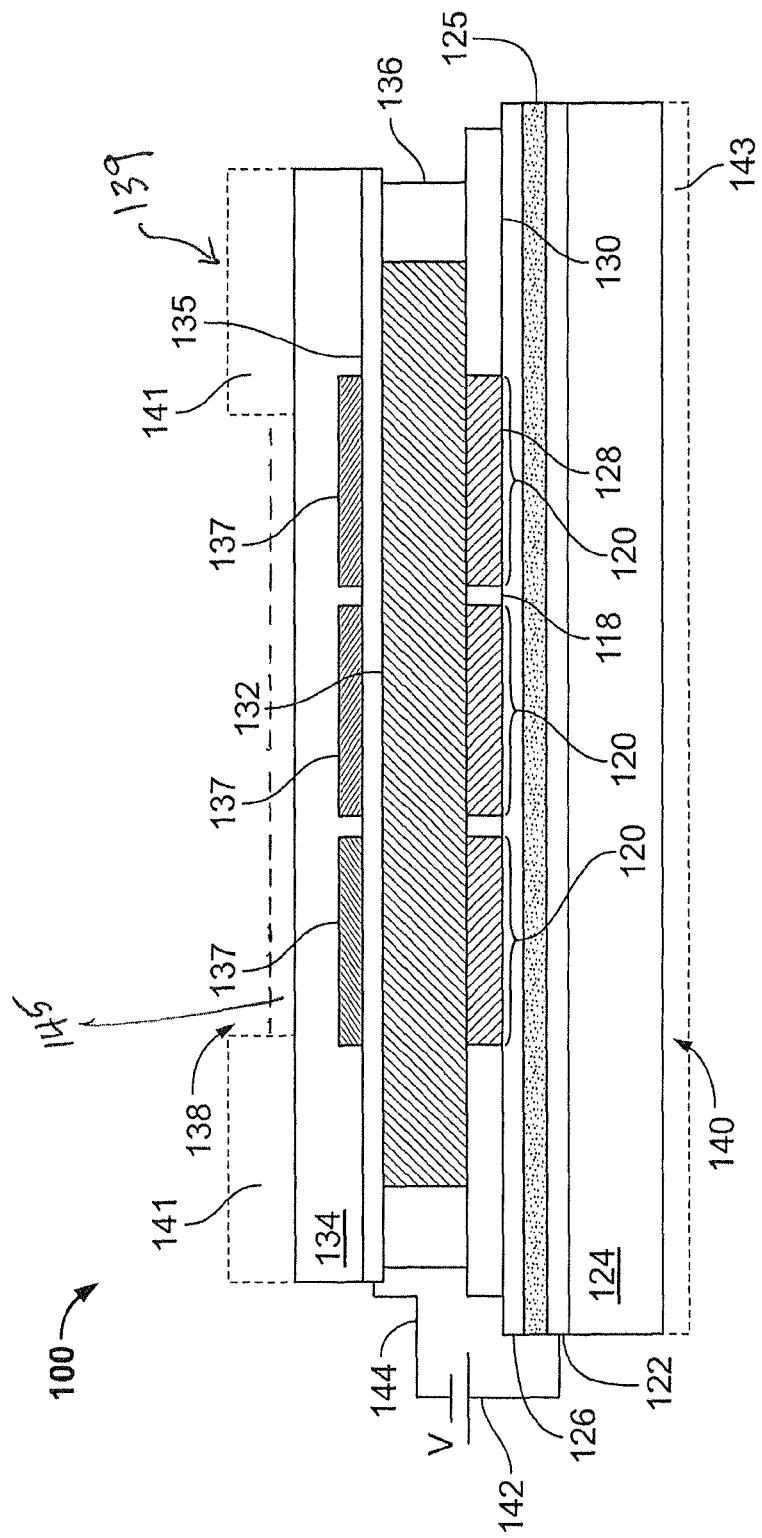
FIG. 1B is a cross-section of a portion of the electrowetting display device of FIG. 1A, according to some embodiments.

FIG. 1B is a cross-section of a portion of the electrowetting device 100 showing several electrowetting pixels 120 that generally correspond to pixels 112, according to some embodiments.

An electrode layer 122 that includes the pixel electrodes 116 (not illustrated in FIG. 1B) is formed on a bottom support plate 124. Thus, the electrode layer 122 is generally divided into portions that serve as the pixel electrodes 116 (not illustrated in FIG. 1B).

In some implementations, a dielectric barrier layer 125 may at least partially separate the electrode layer 122 from a hydrophobic layer 126 also formed on the bottom support plate 124 over the electrode layer 122. While optional, the dielectric barrier layer 125 may act as a barrier that prevents electrolyte components (e.g., an electrolyte solution) from reaching the electrode layer 122. The dielectric barrier layer 125 may comprise a silicon dioxide layer (e.g., about 0.2 microns thick) and a polyimide layer (e.g., about 0.1 micron thick), though claimed subject matter is not so limited.

In some implementations, the hydrophobic layer 126 can comprise a fluoropolymer, such as, for example, AF1600, produced by DuPont, based in Wilmington, Del.

The pixel walls 118 form a patterned electrowetting pixel grid on the hydrophobic layer 126, as can be seen in FIG. 1A. The pixel walls 118 may comprise a photoresist material, such as, for example, epoxy-based negative photoresist SU-8. The patterned electrowetting pixel grid comprises rows and columns that form an electrowetting pixel array (e.g., electrowetting display panel 110). For example, an electrowetting pixel can have a width and length in a range of about 50 to 500 microns. A first fluid 128, which can have a thickness in a range of about 1 to 10 microns, for example, overlies the hydrophobic layer 126. The first fluid 128 is generally an oil, often referred to as an electrowetting oil, and is partitioned by the pixel walls 118 of the patterned electrowetting pixel grid. An outer rim 130 can comprise the same material as the pixel walls 118. A second fluid 132, such as a fluid that includes an electrolyte, overlies the oil 128 and the pixel walls 118 of the patterned electrowetting pixel grid.

The second fluid 132 is substantially immiscible with the first fluid 128. Generally, immiscible refers to the inability of the second fluid 132 to mix or blend with the first fluid 128. The second fluid 132 generally includes an electrolyte and is electrically conductive or polar. The second fluid 132 may be water or a salt solution such as a solution of potassium chloride in a mixture of water and ethyl alcohol, for example. The second fluid 132 may be transparent, colored, or color-absorbing. The first fluid 128, generally referred to as oil, is electrically non-conductive and may for instance be an alkane like hexadecane or (silicone) oil. The hydrophobic layer 126 is arranged on the bottom support plate 124 to create an electrowetting surface area. The hydrophobic character causes the first fluid 128 to adhere preferentially to the bottom support plate 124 since the first fluid 128 has a higher wettability with respect to the surface of the hydrophobic layer 126 than the second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

A color filter 137 may be positioned over each pixel 120. The color filters 137 may be transmissive to certain portions of the visible light spectrum (e.g., red), while inhibiting transmission of other portions of the visible light spectrum (e.g., non-red colors of light). In this manner, color filters 137 may be used to associate each pixel 120 with a particular color. In one embodiment, pixels 120 may correspond to sub-pixels of device 100. In that case, each sub-pixel 120 may include the appropriate color filters 137 so that four different sub-pixels 120 correspond to a red sub-pixel, a green sub-pixel, a blue sub-pixel and a white sub-pixel of a larger pixel.

A top support plate 134 is positioned opposite the bottom support plate 124. The top support plate 134 covers the second fluid 132 and edge seals 136 retain the second fluid 132 over the electrowetting pixel array. Spacers (not shown) may be positioned on one or more of the pixel walls 118 between the top support plate 134 and the bottom support plate 124 to define the distance between the top support plate 134 and the bottom support plate 124 and to provide structural support to the display. The bottom support plate 124 and the top support plate 134 may be separate parts of individual electrowetting pixels or the bottom support plate 124 and the top support plate 134 may be shared by a plurality of electrowetting pixels. The bottom support plate 124 and the top support plate 134 may be made of glass or polymer and may be rigid or flexible, for example.

A voltage V applied across the second fluid 132 and the dielectric barrier layer stack (e.g., the hydrophobic layer 126) of individual electrowetting pixels can control transmittance or reflectance of the individual electrowetting pixels. More particularly, in a number of embodiments, electrowetting display 100 may be a transmissive, reflective or transflective display that generally includes an array of pixels or sub-pixels (e.g., pixel regions 112 of FIG. 1A) configured to be operated by an active matrix addressing scheme. For example, rows and columns of electrowetting pixels are operated by controlling voltage levels on a plurality of source lines (e.g., source lines D of FIG. 1A) and gate lines (e.g., gate lines S of FIG. 1A). In this fashion, the electrowetting display 100 may produce an image by selecting particular pixels to at least partly transmit, reflect or block light.

The electrowetting display device 100 has a viewing side 138 on which an image for display formed by the electrowetting display device 100 can be viewed, and a rear side 140. The top support plate 134 faces viewing side 138 and the bottom support plate 124 faces the rear side 140. The top support plate 134 is coupled to the bottom support plate 124 with an adhesive or sealing material 136. In an alternative embodiment, the electrowetting display device 100 may be viewed from the rear side 140. The electrowetting display device 100 may be a reflective, transmissive or transreflective type. The electrowetting display device 100 may be a segmented display type in which the image is built up of segments. The segments can be switched simultaneously or separately. Each segment includes one electrowetting pixel 120 or a number of electrowetting pixels 120 that may be neighboring or distant from one another. The electrowetting pixels 120 included in one segment are switched simultaneously, for example. The electrowetting display device 100 may also be an active matrix driven display type or a passive matrix driven display, just to name a few examples.

FIG. 1B depicts example front and back light devices (note that a single display device 100 may be implemented with only one of front light device 139 and back light device 143. Front light device 139 may be mounted to a front side of display device 100 on viewing side 138. Front light device 139 may be implemented as a light source 141, such as an LED or array of LEDs positioned at or near the edge of display device 100, with the light emitted by the light source 141 being coupled into a light guide 145 which guides the light towards the display area. In other embodiments, such as when device 100 is transmissive display, device 100 may include back light device 143 formed over a back surface of device 100. In that case, back light device 143 is configured to transmit light through pixels 120 and out through viewing side 138 of display 100.

The electrode layer 122 is separated from the first fluid 128 and the second fluid 132 by an insulator, which may be the hydrophobic layer 126. The electrode layer 122 (and thereby the pixel electrodes 116) is supplied with voltage signals V by a first signal line 142 as will be further described herein. A second signal line 144 is electrically connected to a top electrode 135 that is in contact with the conductive second fluid 132. This top electrode may be common to more than one electrowetting pixel 120 if the electrowetting pixels 120 are fluidly interconnected by and share the second fluid 132 uninterrupted by the pixel walls 118. The electrowetting pixels 120 are controlled by the voltage V applied between the first and second signal lines 142 and 144.

The first fluid 128 absorbs at least a part of the optical spectrum. The first fluid 128 may be transmissive for a part of the optical spectrum, forming a color filter. For this purpose, the first fluid 128 may be colored by addition of pigment particles or dye, for example. Alternatively, the first fluid 128 may be black (e.g., absorbing substantially all parts of the optical spectrum) or reflecting. The hydrophobic layer 126 may be transparent or reflective. A reflective layer may reflect the entire visible spectrum, making the layer appear white, or part of it, making it have a color.

When the voltage V applied between the signal lines 142 and 144 is set at a non-zero active signal level, the electrowetting pixel 120 will enter into an active state. Electrostatic forces will move the second fluid 132 toward the electrode layer 122, thereby displacing the first fluid 128 from the area of the hydrophobic layer 126 towards a portion of one or more pixel wall 118 surrounding the area of the hydrophobic layer 126, to a droplet-like shape. This action uncovers the first fluid 128 from the surface of the hydrophobic layer 126 of the electrowetting pixel 120. When the voltage across the electrowetting pixel 120 is returned to an inactive signal level of zero volts or a value near to zero volts, the electrowetting pixel 120 will return to an inactive state, where the first fluid 128 flows back to cover the hydrophobic layer 126. In this way, the first fluid 128 forms an electrically controllable optical switch in each electrowetting pixel 120.

Generally, the thin film transistor 114 includes a gate electrode that is electrically connected to a corresponding scan line of the scan lines S, a source electrode that is electrically connected to a corresponding data line of the data lines D, and a drain electrode that is electrically connected to the pixel electrode 116. Thus, the pixel regions 112 are operated, i.e. driving of the electrowetting display 100, based upon the scan lines S and the data lines D of FIG. 1A.

For driving of electrowetting displays via the scan lines S and the data lines D, a dedicated gate scanning algorithm may generally be implemented. The gate scanning algorithm generally defines an address time for addressing rows of pixel regions 112. Within each input frame, each row (corresponding to the scan lines S) of electrowetting pixels 120 (i.e. pixel region 112) within the electrowetting display 100 generally needs to be written twice. On occasion, the amount of writing can be more, depending on the actual drive scheme implementation. In general, the first write action discharges an electrowetting pixel 120 to a reset level, e.g., a black level voltage, which is also referred to as a reset of the pixel region 112. The second write action generally charges the electrowetting pixel 120 to an actual required display data value. Often, pixel regions 112 may need to be refreshed to maintain their appearance when the corresponding data value for a particular pixel region 112 does not change. This is especially true when the electrowetting display 100 is displaying a still image when all of the pixel regions 112 may need to be refreshed. A refresh sequence generally involves a reset sequence followed by a repeat sequence, which recharges pixel regions 112 with their display data values.

Figure 1C:
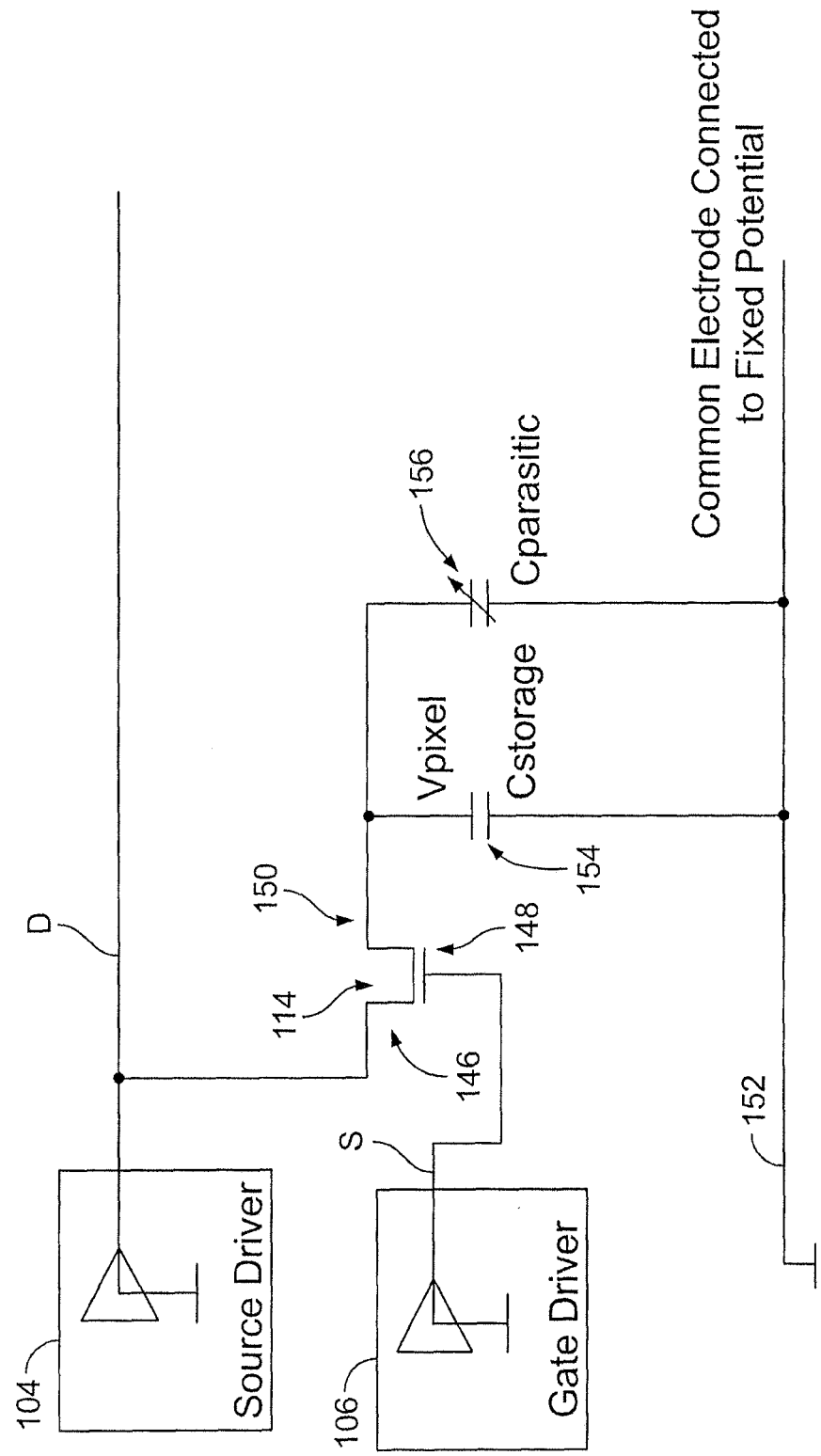
FIG. 1C is a schematic view representing circuitry for pixel regions within the electrowetting display of FIGS. 1A and 1B, according to some embodiments.

FIG. 1C schematically illustrates an arrangement of thin film transistor (TFT) 114 for a pixel region 112 within the electrowetting display 100. Each pixel region 112 within the electrowetting display 100 generally includes such an arrangement. The source driver 104 is coupled to a data line D. The data line D is coupled to a source 146 of the TFT 114 for the pixel region 112. A scan line S is coupled to a gate 148 of the TFT 114. The scan line S is coupled to a gate driver 106. A drain 150 of the TFT 114 is coupled to a common line 152 that is coupled to a fixed potential of a common electrode (not illustrated) within the electrowetting display 100. The common line 152 may also be coupled to ground. A storage capacitor 154 is provided between the TFT 114 and the common line 152. A variable parasitic capacitance, Cparasitic, is present in each pixel region 112 between the drain 150 of the TFT 114 and the common line 152. The variable parasitic capacitance is represented by a variable capacitor 156.

When utilizing display 100, the viewer's perceived picture quality can be affected by brightness or luminance variations of the electrowetting display due to capacitor leakage (charge leakage from storage capacitors of pixel regions of the electrowetting display), backflow (fluid movement within the pixel regions of the electrowetting display) and reset pulses (resetting of pixel regions within the electrowetting display). The luminance variations depend upon physical properties of the electrowetting display, as well as the input frame-rate from the image source, repeat rate for mitigating leakage and refresh rate for mitigating backflow and reset pulse intensity.

After the storage capacitor of a particular pixel is set to a particular potential, the capacitor slowly leaks charge, effectively reducing the driving voltage of that particular pixel. Charge may leak from the capacitor due to current flow through active matrix switches and the dielectric materials making up the pixel's capacitor, for example. As the charge stored in the storage capacitor leaks out, the electric potential formed between the pixel's common line 152 and the drain of the TFT 150 gradually diminishes. As that potential grows smaller, the electric field that cause second fluid 132 to move into the electrowetting pixel are, in turn, reduced. A smaller displacement of first fluid 128 results in the pixel appearing to grow dimmer. In a display device 100 that relies on reflectance, this will result in the pixel's luminance being diminished over time.

Figure 2A:
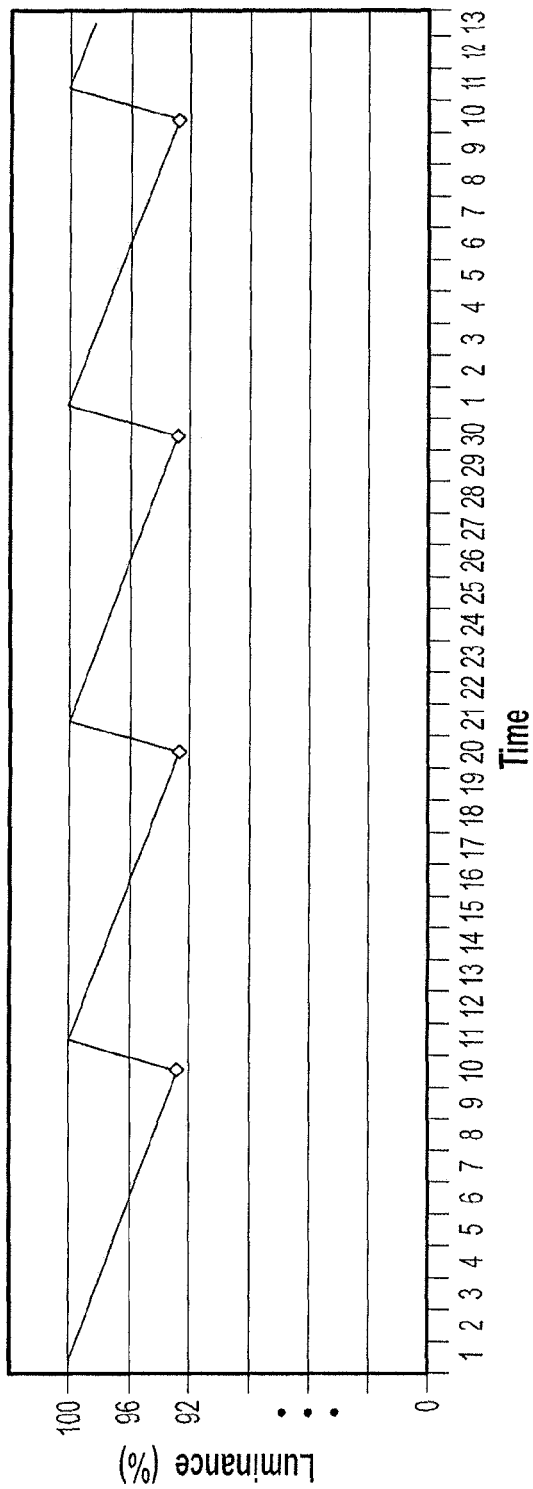
FIGS. 2A-2B are graphs illustrating reductions in pixel luminance over time.

FIG. 2A is a graph illustrating variations in luminance of an example electrowetting pixel that result from current leakage out of the electrowetting pixel capacitor. In the present disclosure, luminance refers to a photometric measure of the luminous intensity per unit area of light travelling in a given direction.

In FIG. 2A, the vertical axis represents a percentage of a maximum luminance (e.g., measured in candela per square meter (Cd/m2)) of the electrowetting pixel, while the horizontal axis represents time. In this example, each unit of time represents an address period of the display device. An address period refers to the period of time required for the display device to select and subject all pixels in the display to a target driving voltage.

In this example, the display device is attempting to set the pixel to a target luminance percentage of 100%. Accordingly, the display device's timing controller will initially cause the electrowetting pixel to be subjected to a driving voltage corresponding to that target luminance value. This occurs in the first address period shown on FIG. 2A. Thereafter, an ideal electrowetting pixel, no longer being subjected to the driving voltage would maintain its state, with no changes in luminance. As illustrated in FIG. 2A, however, over time the electrowetting pixel's luminance gradually diminishes. The reduction in luminance depicted in FIG. 2A is attributable to charge loss from the pixel's storage capacitor. In an attempt to mitigate this reduction in luminance, the display device's timing controller will periodically readdress the electrowetting pixel (indicated by the dots at addressing periods 10, 20, 30, and 10) to set the pixel's capacitor to the original target driving voltage. Readdressing involves the electrowetting pixel's capacitor being driven again to the original driving voltage. In this example, the pixel is readdressed every 10 address cycles. It is this addressing that causes the pixel's luminance to temporarily jump back up to the desired luminance value (i.e., every 10 address cycles). But, as shown in FIG. 2A, over time and between readdressing cycles, the luminance will drop over time.

If the electrowetting pixel were to be readdressed every single addressing cycle (i.e., in every addressing period), the pixel's luminance would not fall significantly due to capacitor leakage (by reapplication of the target driving voltage). In such an implementation, a viewer of the display device may not notice any reductions or variations in luminance at all. Such an approach, however, could utilize a relatively large amount of power. In a mobile application, this could result in the device's power source (i.e., battery) being quickly depleted.

Accordingly, in some applications, the frequency of readdressing is reduced (as in the example of FIG. 2A) to minimize power consumption. Although potentially improving the efficiency of the display device, as the frequency of readdressing is reduced, variations in pixel luminance can become more noticeable to the viewer.

Note that in the example shown in FIG. 2A, the chart does not take into account potential reset processes described below and depicts only changes in luminance due to capacitor leakage and readdressing. When a reset process occurs at the same time as readdressing, the timing controller may be configured to not readdress the pixel and instead execute the reset process. This is because the reset process renders the readdressing of the pixel unnecessary.

Another source of periodic reductions in luminance of an electrowetting pixel includes backflow and reset pulses. As discussed above, after the capacitor of an electrowetting pixel has been set to a particular driving voltage, even without leakage from the capacitor, the fluids of the electrowetting pixel will exhibit backflow. This is a tendency of the liquids, even when subjected to constant electrostatic forces, to return to their original resting condition. This tendency, therefore, causes the electrowetting pixel to gradually lose luminance over time as the first fluid returns to its resting position covering the entire pixel. In order to correct the backflow effect, the electrowetting pixel is reset.

Resetting a pixel involves first and second write actions. In a first write action, the pixel is driven with a minimal driving voltage, thereby resetting the position of the first fluid within the pixel, effectively closing the electrowetting pixel. The minimal driving voltage may be equal to zero volts or could be a driving voltage that is below a particular threshold, where the threshold is the maximum voltage at which the pixel will close.

After the pixel has been driven with the minimal driving voltage in the first write action, in a second write action the pixel is subjected to a driving voltage corresponding to the desired luminance for the pixel. In some cases, the pixel's capacitor will not be sufficiently charged by subjecting the capacitor to the desired driving voltage for a single address period. As such, the second write action may involve subjecting the pixel's capacitor to the desired driving voltage for two or more address cycles.

Both the backflow tendency and the reset procedure can cause undesired reductions in a pixel's luminance from the target luminance value.

Figure 2B:
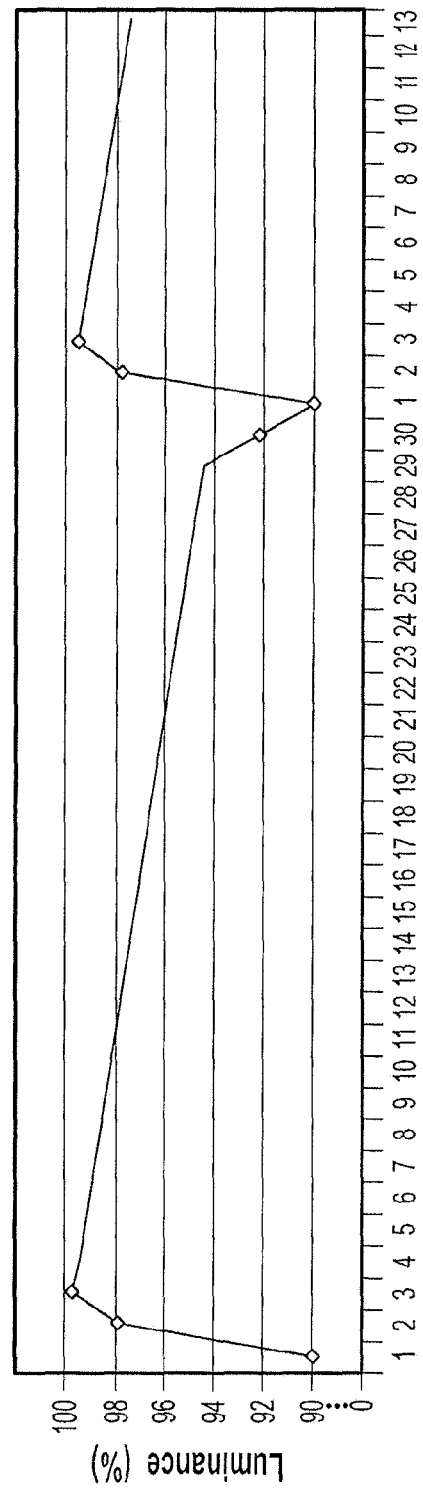

FIG. 2B is a graph illustrating variations in luminance of an electrowetting pixel that result from a result pulse cycle and backflow effects. In FIG. 2B, the vertical axis represents a percentage of maximum luminance of the electrowetting pixel, while the horizontal axis represents time. In this example, each unit of time represents an address period of the display device. In this example, the display device is attempting to set the pixel to a target luminance percentage of 100.

In the first addressing period (at time value 1), the pixel has been reset as a first part of the reset process. As such, the pixel has been subjected to a minimal driving voltage and exhibits a relatively small luminance. In the second and third addressing periods, the second part of the reset process is executed in which the pixel is subjected to a driving voltage corresponding to the desired luminance. As illustrated, it requires two addressing periods at the desired driving voltage before the pixel's capacitor is fully charged to the driving voltage and the pixel achieves the desired luminance.

But, after the reset process is complete, the pixel's luminance gradually diminishes due to the backflow effect described above. As such, after a period of time, the pixel must be reset again. This occurs in accordance with the display device's refresh rate. In this example, the refresh rate causes the pixel to be reset every 30 address cycles.

Over time, therefore, the luminance of a particular pixel will vary according to both the charts of FIGS. 2A and 2B. When set to a particular target driving voltage, the pixel's luminance will diminish according to the sum of the capacitor leakage, backflow, and reset process effects.

In a low power device, such as a one running at a refresh rate of approximately 1 Hz, and when accumulated over all pixels in a particular display device, these effects may result in a noticeable variation in the brightness of the display device. Although these effects could be mitigated to some degree by increasing the device's refresh rate, such an approach could result in a significant drain of the device's power source.

In the present display device, therefore, these periodic reductions in pixel luminance are compensated for by the device's timing controller adjusting or modulating an output of the display device's front or back light (collectively referred to herein as an illumination device).

In an electrowetting display device, an illumination device may be utilized to supplement ambient light striking a surface of the display device or passing through the electrowetting pixels of the display device. In many cases, illumination devices are merely utilized to provide a sufficient level of brightness. A user, for example, could adjust the amount of supplemental light being supplied by the illumination device according to a brightness level selection made via a suitable user interface.

In the present device, however, the timing controller is configured to introduce fluctuations in the output of the device's illumination device to compensate for the reductions in luminance of the device's pixels.

Figure 3:
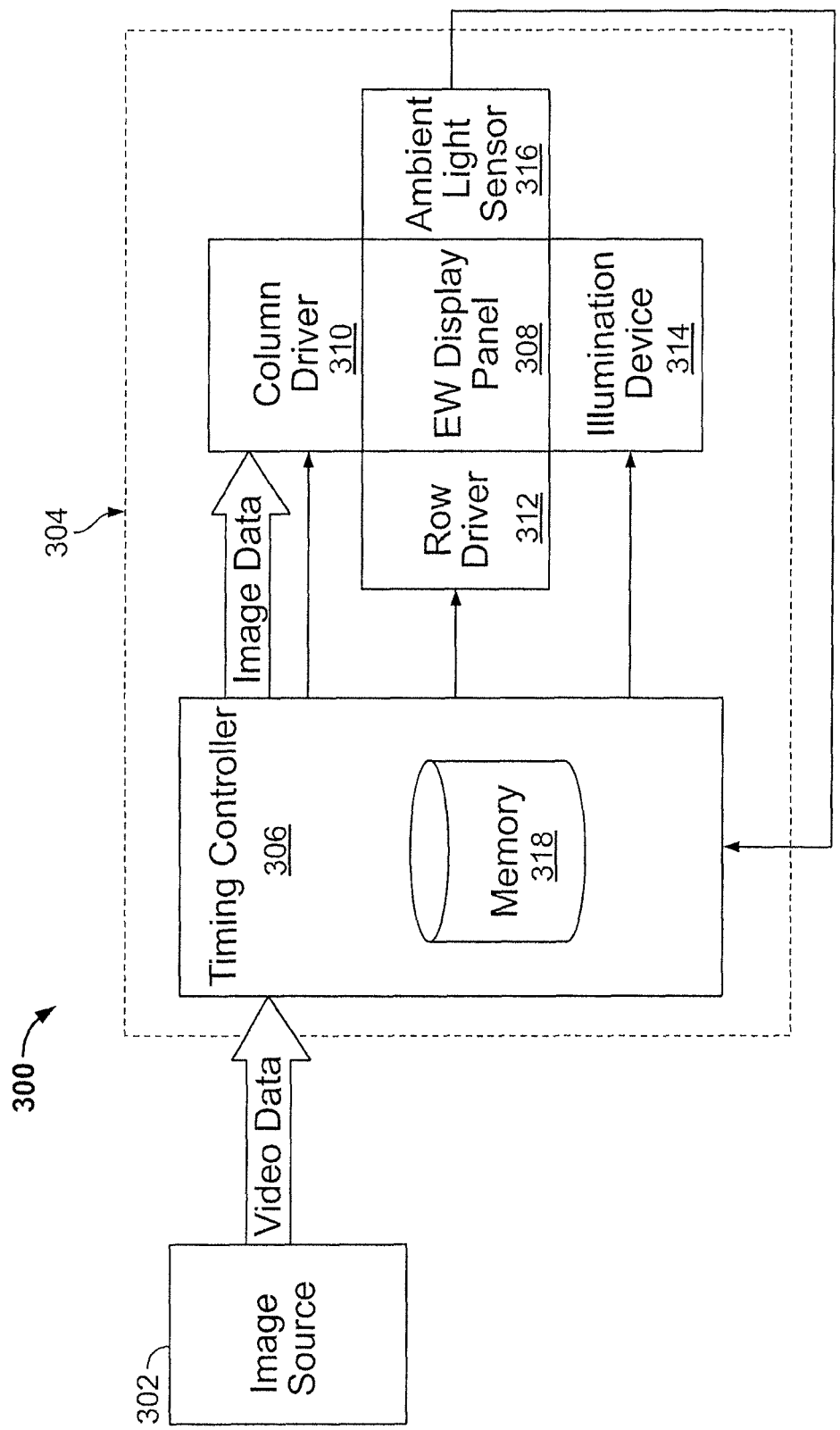
FIG. 3 schematically illustrates a simplified arrangement for a portion of an electronic device, according to some embodiments.

FIG. 3 schematically illustrates a simplified arrangement for a portion of an electronic device 300 configured in accordance with the present disclosure to modify an output of an illumination device to compensate for reductions in pixel luminance.

The electronic device 300 comprises an image source 302, e.g., a graphic controller, and an electrowetting display 304 similar to the electrowetting display 100. The electrowetting display 304 comprises a timing controller 306, an electrowetting display panel 308 (similar to the electrowetting display panel 110 and thus, made up of rows and columns of pixel regions 112), column driver 310 and a row driver 312. The timing controller 306 generally corresponds to the timing controller 102 of the electrowetting display 100 and the column driver 310 generally corresponds to the source driver 104 of the electrowetting display 100, while the row driver 312 generally corresponds to the gate driver 106 of the electrowetting display 100. The timing controller 306 controls the column driver 310 and the row driver 312 using one or more addressing schemes that are included in the timing controller 306 as either software or firmware.

An illumination device 314 is coupled to device 300 and configured to illuminate at least a portion of display panel 308 and the pixels therein. If display panel 308 is implemented as an array of transmissive pixels, the illumination device 314 may be implemented as a back light. In which case, when activated, the illumination device 314 causes light to pass through the open pixels of the display panel 308 to a viewer. Conversely, if the display panel 308 is implemented as an array of reflective pixels, the illumination device 314 may be implemented as a front light. In which case, when activated, the illumination device 314 causes light to strike the viewing surface of the display panel 308 and be reflected back out of open pixels to a viewer.

The illumination device 314 may be implemented using any appropriate light generating devices, such as an LED or an array of LEDs. The illumination device 314 may include a single light source disposed at one edge of the display panel 308, or, when implemented as a backlight, may include a number of different light sources distributed over a back surface of the display panel 308. Alternatively, the illumination device 314 may include one or more light bulbs, such as one or more halogen light bulbs.

The illumination device 314 is coupled to the timing controller 306 enabling the timing controller 306 to control an output of the illumination device 314 and, specifically, a magnitude of light generated by the illumination device 314. In one specific embodiment, for example, the illumination device 314 is driven by a pulse-width modulated (PWM) power supply. In that case, the timing controller 306 may control the output of the illumination device 314 by adjusting or controlling the duty cycle of the PWM power supply that powers the illumination device 314.

Generally, the timing controller 306 is configured to modify the output of the illumination device 314 at a relatively high frequency, such as by being able to change the output of the illumination device 314 every 1/60 of a second. As such, the timing controller 306 may adjust the output of the illumination device 314 at a rate about equal to the address period of the device 300. As such, the timing controller 306 can adjust or change the output of the illumination device 314 each time the timing controller 306 may also change the driving voltage being supplied to the electrowetting pixels of the device 300.

As the device 300 operates, therefore, the timing controller 306 can adjust the output of the illumination device 314 to compensate for reductions in pixel luminance resulting from backflow, capacitor leakage, and reset pulses. As the luminance of the pixels of the device 300 diminish, the timing controller 306 can increase the output of the illumination device 314 so that the brightness of the device 300 appears to stay constant.

Generally, in the device 300, all pixels will be reset and set to driving voltages in the same address period. After all pixels are set to initial driving voltages, some number of addressing periods will pass before the pixels are readdressed. This period of time may include many tens of addressing periods. Finally, after all pixels have been readdressed a number of times, the pixels will again be reset and driven to desired driving voltages. In the initial step, all pixels may be reset and driven to an initial driving voltage in a relatively short amount of time (e.g., approximately 5 milliseconds).

Because all pixels can be addressed in such a short amount of time, the luminance reduction effects described herein are relatively equally distributed over the entire display device. There will be a small amount of phase shift in the effects in different rows of the pixels, resulting from the way that the individual pixels are addressed one row at a time, but the phase shift is minimal and is unlikely to be noticed by a human observer. This may be particularly true in interlaced display devices in which rows of display pixels are not addressed in a linear manner. This is particularly true as an average viewer will both spatially and temporally low-pass filter the luminance variations of an image depicted by the device 300 on the electrowetting display panel 208. As such, the timing controller 306 can modify the output of the illumination device 314 to achieve a consistent average brightness for the display device 300, even while the luminance of each pixel is varying due to backflow, capacitor leakage, and reset processes.

In a typical device, all pixels will exhibit a similar reduction in luminance over time (i.e., luminance reduction rate). As such, for a particular device, the luminance reduction curves shown in FIGS. 2A-2B, which depict luminance reduction rates in a single example electrowetting pixel may be generalized into luminance reduction rates for an entire electrowetting display. In one embodiment, the luminance reduction rate at which a pixel's luminance changes due to the capacitor leakage, backflow, and reset effects described herein may be predicted for a particular pixel by a suitable mathematical model. In other embodiments, however, the luminance reduction rates could be observed directly, such as in a laboratory setting where the display is exposed to a predetermined and known amount of ambient light. In that case, the changes in luminance for a single pixel could be measured (e.g., with a photometer or lux meter), with the assumption that all pixels within the display would behave in a similar manner. Alternatively, the luminance reductions rates could be measured for all pixels within the display at the same time. In this case, the luminance reduction rates could be measured by setting all pixels within the display to their fully open condition (i.e., driving the pixels with a maximum driving voltage) and then directly observing how the luminance of the entire display changes over time.

Having determined the luminance reduction rates for the entire display, a compensation scheme can be determined for the illumination device 314. When the output of the illumination device 314 is adjusted according to the compensation scheme, the changes in luminance of the pixels of the display will be offset or compensated for by an inverse change in the luminance of the illumination device 314. For example, if the luminance reduction rate for one pixel in a display is x % per addressing period, the overall luminance reduction rate for the entire display will be approximately x % per addressing period. For such a device, a compensation scheme may call for increasing the output of illumination device 314 by x % per addressing period in compensation. Accordingly the compensation scheme may call for increasing an output of illumination device 314 at a rate that is inversely proportional to the rate at which luminance of the pixels in the display device decrease.

Figure 4A:
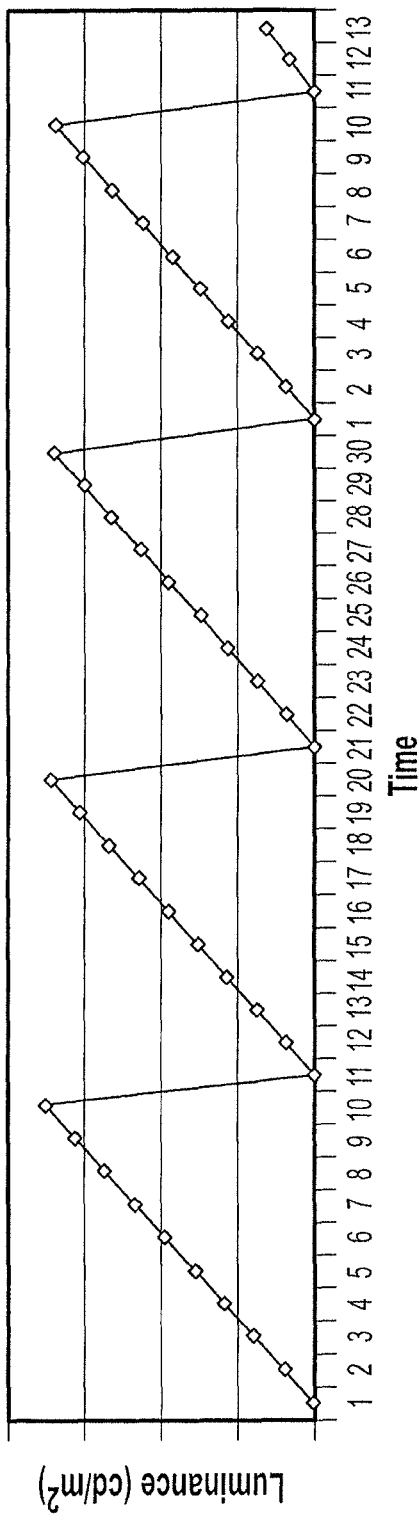
Figure 4B:
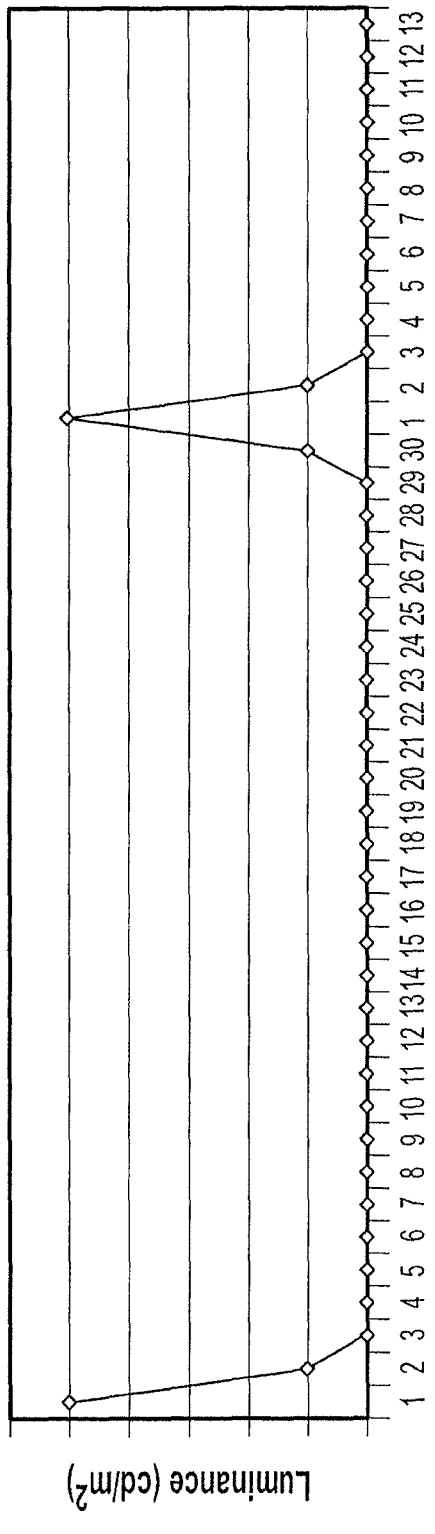

FIGS. 4A-4C are graphs illustrating how the output of the illumination device 314 may be adjusted to compensate for the reduction in pixel luminance across all pixels of an electrowetting display device. The examples shown in the figures presume a display device having a timing controller configured to readdress all pixels in the display every 10 addressing periods. The timing controller is also configured to reset all pixels every 30 addressing periods. In an example device, the addressing period for all pixels in the display may be approximately 5 milliseconds (in one embodiment, about 5.12 milliseconds).

In each of FIGS. 4A-4C, the vertical axis represents the amount of additional output (e.g., luminance) of the illumination device 314 necessary to offset a corresponding reduction in pixel luminance. The horizontal axis represents time, where each unit of time represents an address period of the display device.

FIG. 4A shows how the output of the illumination device 314 may be adjusted to compensate for reductions in pixel luminance that may result from pixel capacitor leakage. As illustrated in FIG. 2A, capacitor leakage can result in a reduction of pixel luminance over time. Periodically the pixel will be readdressed, resetting the luminance of the pixel to the desired level, but capacitor leakage will again cause the luminance of the pixel to gradually diminish.

To compensate, FIG. 4A shows how the output of the illumination device 314 can gradually be increased over time to compensate for the capacitor leakage in the pixels of the device 300. At each readdressing cycle, the output of the illumination device 314 can be reduced (no compensation being necessary) and then, again, increased over time to compensate for capacitor leakage.

As shown in FIG. 4A, the output of the illumination device 314 will be increased by an amount equal to the magnitude of luminance losses due to capacitor leakage across the pixels in the device. As such, if the output of the illumination device 314 is modified according to the graph shown in FIG. 4A, the output of the illumination device 314 will average or cancel out the reduction in luminance resulting from capacitor leakage in the individual pixel of the device.

FIG. 4B shows how the output of the illumination device 314 may be adjusted to compensate for the pixel reset process illustrated in FIG. 2B. In a first addressing period (at time 1), all pixels within the device 300 are reset. As illustrated in FIG. 2B, this reset process causes a temporary reduction in pixel luminance. To compensate for that reduction in luminance, as shown in FIG. 4B, the output of the illumination device 314 may be increased substantially.

In a second addressing period (at time 2), all pixels are being driven with a desired driving voltage. But, as shown in FIG. 2B, in the second addressing period, the pixel capacitors may still be charging and, as such, the luminance of the pixel may not have achieved the desired luminance level. To compensate for this deviation from desired pixel luminance, again as illustrated in FIG. 4B, the output of the illumination device 314 can be set to provide additional illumination (though not as much as was required in the first addressing period).

Finally, in the third addressing period, the pixels of the device 300 will have achieved their target luminance values and, as such, the illumination device 314 is not required to provide any additional illumination to compensate for the pixel reset process.

FIG. 4C shows how the output of the illumination device 314 may be adjusted over time to compensate for the reductions in pixel luminance resulting from the backflow effect. As illustrated in FIG. 2B, the backflow effect can result in a reduction of pixel luminance over time. Periodically the pixel will be reset, resetting the pixel fluid position and mitigating the result of the backflow effect. Over time, however, the backflow effect will again cause the luminance of the pixel to gradually diminish.

To compensate, FIG. 4C shows how the output of the illumination device 314 can gradually be increased over time to compensate for the backflow effect. As illustrated, over time, the output of the illumination device 314 will gradually increase to make the output of the device 300 appear brighter in compensation for the backflow-caused reductions in pixel brightness.

At each reset cycle (occurring in this example every 30 address periods), the pixels of the device 300 are reset and the consequences of the backflow effect are mitigated. As such, no additional output from the illumination device 314 is needed to compensate for backflow during the reset process. Over time, however, the output of the illumination device 314 may be increased to compensate as the backflow effect again begins to reduce pixel luminance.

The output of the illumination device 314 will be increased by an amount equal to the magnitude of luminance losses due to the backflow effect. As such, if the output of the illumination device 314 is modified according to the graph shown in FIG. 4C, the output of the illumination device 314 will average or cancel out the reduction in luminance resulting from backflow.

Each of FIGS. 4A, 4B, and 4C, therefore, illustrate approaches for temporarily increasing or modulating an output of the illumination device 314 to compensate for different causes of pixel luminance reduction within an electrowetting display device. FIG. 4A illustrates a modulation scheme to compensate for luminance reductions due to capacitor losses or leakage. FIG. 4B illustrates a modulation scheme to compensate for luminance reductions due to a reset processes. FIG. 4C illustrates a modulation scheme to compensate for luminance reductions due to backflow effects.

Within a particular device 300, all of these luminance reducing phenomena operate together to reduce overall pixel luminance over time. As such, to provide adequate luminance compensation, each of the adjustments shown in FIGS. 4A-4C may be summed together to generate a scheme for modulating the illumination device 314 to compensate for each of these effects.

FIG. 5A is a graph illustrating how the output of the illumination device 314 may be adjusted to compensate for reductions in pixel luminance resulting from backflow, capacitor leakage, and reset processes. In FIG. 5A, the vertical axis represents the amount of additional output of the illumination device 314 necessary to offset the reductions. The horizontal axis represents time. In this example, each unit of time represents an addressing period of the display device. FIG. 5A is made up by summing the values depicted in FIGS. 4A-4C.

FIG. 5A illustrates, for each addressing period, the amount by which an output of the illumination device 314 should be increased to compensate for the luminance reducing effects described herein. To determine an actual output of the illumination device 314, the values illustrated in FIG. 5A are added to a baseline or nominal output value of the illumination device 314. The nominal output value is the output of the illumination device 314 without any compensation scheme being applied. The nominal output may be determined, for example, by a user setting within the device 300 in which a user has explicitly specified a desired brightness level for the device 300. For example, the user may have accessed a user preference menu by interacting with the device 300 and, using a suitable user interface, selected a particular brightness level for the device 300. That brightness level will be the nominal output value of the illumination device 314, which can then be modified according to the scheme illustrated in FIG. 5A.

The nominal brightness level of the illumination device 314 could also, in some embodiments, be at least partially determined by a value detected by ambient light sensor 316. The ambient light sensor 316 measures a level of ambient electromagnetic radiation (e.g., light) in the environment striking a surface of the device 300, and outputs a signal indicative of the level of ambient radiation to a controller, such as the timing controller 306. In accordance with this signal, the control system may cause the device 300 to adjust the gain of the illumination device, so that a brightness of an image provided by the device 300 is optimized for a viewer in dependence on ambient radiation conditions. Generally, for reflective displays the higher the detected level of ambient radiation, the lower the gain of the modulated value of the illumination device 314. Additionally, the controller can select a particular nominal output value for the illumination device 314 based upon the detected level of ambient radiation detected by the ambient light sensor 316. Generally, for reflective displays the higher the detected level of ambient radiation, the dimmer the nominal output value of the illumination device 314. Ambient light sensor 316 may include one or more photodetector, photoresistors, photodiodes, charge-coupled devices, bolometers, phototransistors, and the like that are configured to detect an intensity of light and convert that intensity of light into a corresponding electrical signal.

Once the nominal output value of the illumination device 314 is determined, the nominal value is summed to the compensation values illustrated in FIG. 5A to determine actual output values for the illumination device 314 that will provide the nominal output value and compensate for the luminance reducing factors described herein.

Figure 5B:
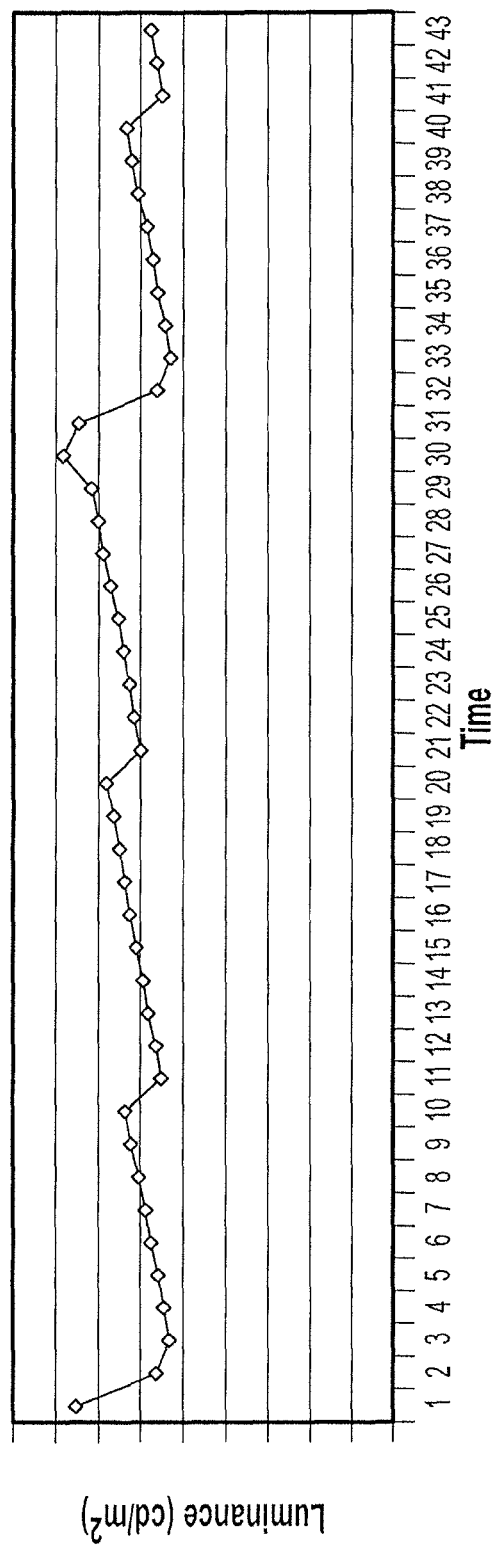

To illustrate, FIG. 5B is a graph illustrating the actual output of the illumination device 314 versus time that is configured to both provide a nominal value as well as the desired luminance compensation.

After the output values depicted in FIG. 5B are determined, those values, or a subset of those values may be stored within memory 318 accessible to the timing controller 306. As the timing controller 306 drives the display panel 308 by setting driving voltages for pixels of the panel 308 and readdressing and resetting those pixels, the timing controller 306 also modifies the output of the illumination device 314 according to the scheme depicted in FIG. 5B and stored in the memory 318.

The compensation scheme may be stored as a series of target output values for the illumination device 314 for each addressing period of the device 300. In one embodiment, the scheme specifies output values for an entire reset cycle (i.e., for address periods that run from one reset process to the next).

Generally, for each address period, the timing controller 306 will lookup the corresponding output value for the illumination device 314 in the memory 318 and set the output of the illumination device 314 to the prescribed value. The sequence is generally triggered by a reset process, so, with reference to FIG. 5B, in the first address period of a reset process, the timing controller 306 will set the output of the illumination device 314 to the value specified for address period 1. In the next address period, the timing controller 306 will set the output of the illumination device 314 to the value specified for address period 2. In the next address period, the timing controller 306 will set the output of the illumination device 314 to the value specified for address period 3, and so one. At the next reset, the process repeats with the timing controller 306 returning to address period 1 and setting the output of the illumination device 314 accordingly.

In various embodiments, many different luminance reduction compensation schemes may be implemented by the timing controller 306. For example, the compensation scheme may be configured to compensate for 100% of luminance reductions that may occur within an electrowetting pixel over time given a particular level of ambient lighting. Alternatively, the compensation scheme may only compensate for 75% of 50%, or some other percentage of the luminance reductions. In some other embodiments, the compensation scheme may only compensate for some of the causes of luminance reduction. For example, a compensation scheme may only compensate for luminance reductions resulting from pixel capacitor leakage, and not for other sources of luminance reduction. The compensation schemes may call for adjusting the output of the illumination device 314 in each addressing period of 300. In other embodiments, the output of the illumination device 314 may only be adjusted in a subset of available addressing period, such as every other addressing period or once every five addressing periods.

When implementing a particular compensation scheme, the timing controller 306 may be configured so that the output of the illumination device 314 is set to a target output value at the very beginning of the corresponding address period (i.e., when the first row of pixels is being addressed in a particular addressing period). In other cases, the timing controller 306 may be configured so that the output of the illumination device 314 is set to a target output value at the very end of the corresponding addressing period (i.e., when the last row of pixels is being addressed in a particular addressing period). In yet other embodiments, the timing controller 306 may be configured so that the output of the illumination device 314 is set to a target output value at the middle, or approximately the middle, of the corresponding address period (i.e., when the middle or approximate middle row of pixels in the display device is being addressed in a particular addressing period).

When modulating the illumination device 314 in accordance with a particular luminance compensation scheme, if the illumination device 314 has a nominal value that is equal to or sufficiently close to the maximum output of the illumination device 314, the timing controller 306 may be unable to increase the output of the illumination device 314 in accordance with the compensation scheme. In that case, the timing controller 306 may slowly reduce the output of the illumination device 314 over time to create a stable brightness level enabling the compensation scheme to be implemented, thereby, reducing the visual image artifacts. In other embodiment, a maximum nominal value of the illumination device 314 may be defined at a value that is sufficiently less than the actual maximum output value of the illumination device 314 to provide sufficient headroom enabling the compensation scheme to be implemented.

In some cases, particularly for transreflective and reflective displays, the amount of ambient light striking the viewing surface of an electrowetting display device may affect the amount of illumination device compensation. For example, when an amount of ambient light doubles, the corresponding luminance in the display device's pixels may also double. As such, in various embodiments, the output of the ambient light sensor 316 may be utilized to modify or fine-tune the luminance compensation scheme. In one embodiment, the output of the ambient light sensor 316 is converted into a compensation value that can be used to either increase or decrease the amount of luminance compensation provided by the modulation of the illumination device 314. Compensation values are generally configured for optimal front of screen performance and so can be determined by direct observation of a display device in various conditions. For reflective displays the compensation values may be typically less than 4% of the total illumination of the display panel. Hence in a dark ambient the nominal illumination device output can be modified in the range of minus 2% to plus 2%, maintaining its nominal brightness. In a bright environment the illumination device may not be driven at a nominal value, hence its full range can be used for compensation. An illumination device capable of driving 100 Cd/m$^2$ may be able to compensate in an ambient illumination of 10000 Cd/m$^2$ with a modulation range of 1%.

Figure 6:
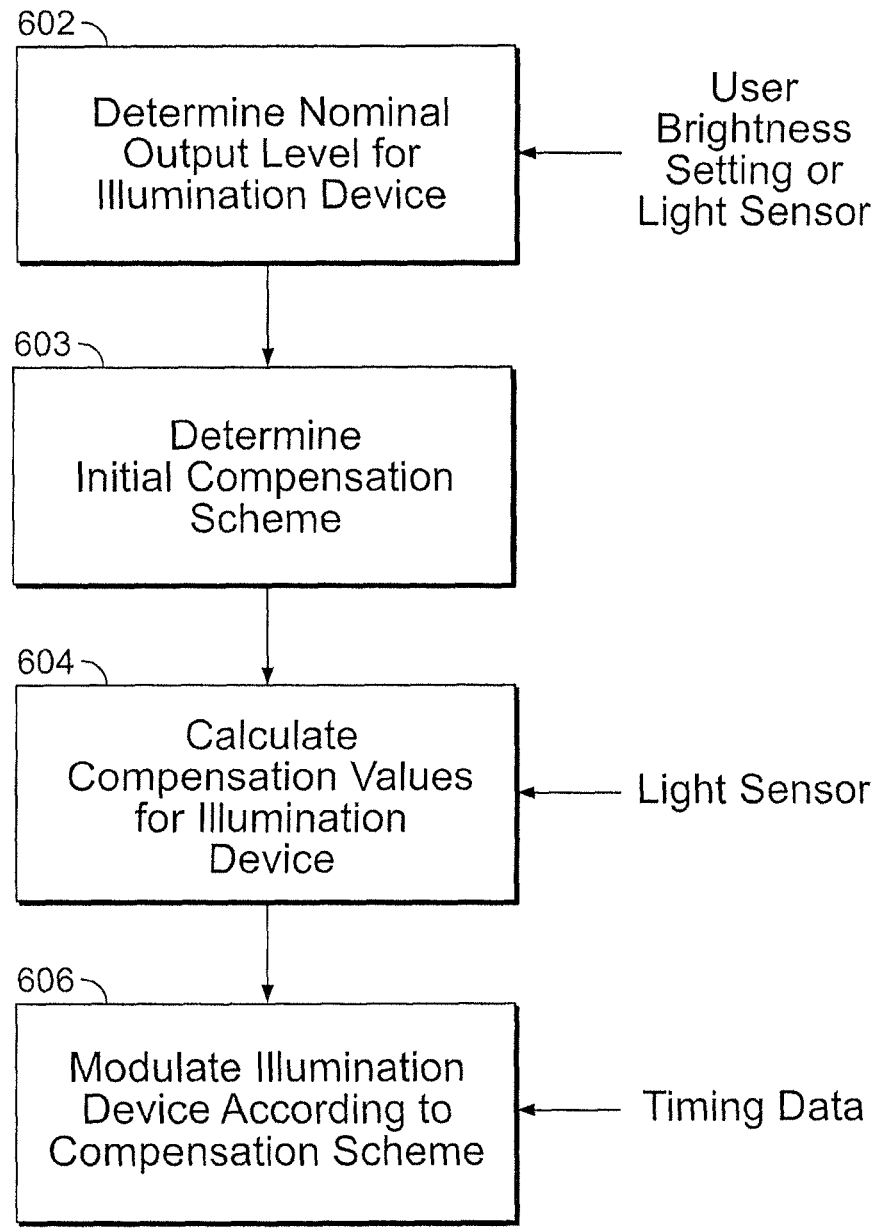
FIG. 6 is a flowchart illustrating a process for a timing controller to modify an output of an illumination device to offset pixel luminance reductions.

FIG. 6 is a flow chart depicting a method implemented by the timing controller 306 to perform luminance compensation. In step 602, a baseline or nominal output level for the illumination device 314 is determined. As discussed above, the nominal output value may be at least partially determined by a user-selected display device brightness preference, ambient lighting values captured by the ambient light sensor 316, or combinations thereof. In one embodiment, the nominal output value may not be allowed to exceed a maximum nominal value, where the maximum nominal value is a value less than the actual maximum output value of the illumination device 314. This may be done to ensure sufficient headroom in the output values of the illumination device 314 to enable the compensation scheme to be successfully implemented.

In step 603 a nonvolatile memory (e.g., memory 318 of FIG. 3) is accessed to determine an initial compensation scheme for the illumination device 314. The initial compensation scheme, for example, may describe how the output of the illumination device 314 can be adjusted to compensate for the luminance reduction in pixels of the display that may be observed given a particular ambient light condition. In one embodiment, for example, the initial compensation scheme may be identified for an ambient light level commonly observed in an office environment.

In step 604 the actual compensation values for the compensation scheme can be calculated. This step may involve, for example, analyzing data captured by the ambient light sensor 316 to determine an appropriate multiplier or compensation factor for the initial compensation scheme identified in step 603. Once determined the compensation factor is multiplied by each of the values of the initial compensation scheme (e.g., the compensation scheme illustrated in FIG. 5A), to determine an ambient light-adjusted compensation scheme. The ambient light-adjusted compensation scheme can be summed to the nominal output value to determine a final compensation scheme. The final compensation scheme specifies, for a number of addressing periods in a display device's reset cycle, target output values for the device's illumination device 314. The target output values are selected to achieve both a nominal output from the illumination device 314, as well as to provide additional amounts of illumination configured to offset reductions in luminance of the device's pixels resulting from capacitor leakage, backflow, and reset processes.

Once determined, in step 606 the timing controller 306 modifies the output of the illumination device 314 accordingly to the ambient-light adjusted compensation scheme. When modulating the output of the illumination device 314, the timing controller 306 utilizes the display timing data, which may indicate the occurrence of reset processes or readdressing periods, so that the modulation of the illumination device 314 can coincide accurately with the reset and readdressing procedures.

The present approach for luminance compensation may be implemented in a number of different display devices where problems such as, but not limited to, pixel capacitor leakage, backflow, and reset processes can create visual artifacts. This may be the case, for example, in devices that tend to operate with slower refresh rates, such as e-reader tablets and display devices depicting generally static, or slow-moving content.

When implementing the compensation scheme, because both the timing controller 306 addressing and the illumination device 314 illuminating the device consume energy, an optimal balance between energy consumption of the addressing rate and the illumination device 314 may be established. For example, the addressing of an electrowetting display may consume up to 1 Watt of power (60 Hz) and the illumination device 314 may consume up to 1 Watt of power. In that case, the image rate for still images can be reduced from 60 Hz, to a rate where the effects of leakage, backflow and reset pulses are hardly visible to a view of the device. In such an implementation, the repeat rate of the device can be limited to about 30 Hz, and the refresh rate to about 5 Hz, reducing the power consumption due to 40 Hz addressing by a factor 2 (remaining power=0.5 Watt).

When implementing the present illumination device 314 compensation schemes, the repeat rate of an example device can be limited to about 5 Hz and refresh rate of can be limited to about 1 Hz, reducing the power consumption for addressing by a factor of 10 (remaining power=0.1 Watt). When the transmission and/or reflection is reduced by max. 4%, the average brightness can be maintained in dim ambient conditions by modulating the illumination in the range of −2% to +2%.

In very bright ambient conditions a full range modulation may require 50% of the maximum illumination device output. Hence, in that case there may be a tradeoff between the power saved by reducing addressing and refresh rates and the extra power required for illumination device compensation.

The addressing scheme of the timing controller 306 is generally provided via software or firmware to perform one of the methods of providing luminance compensation. However, in embodiments, the addressing scheme of the timing controller 306 may be provided via software or firmware to perform one or more of the methods. In such embodiments, a user of the electronic device 300 (and thus a user of the electrowetting display 304) may select which method to use or the timing controller 306 may select which method to use based upon pre-determined criteria such as power consumption, reduced visual artifacts, etc.

Figure 7:
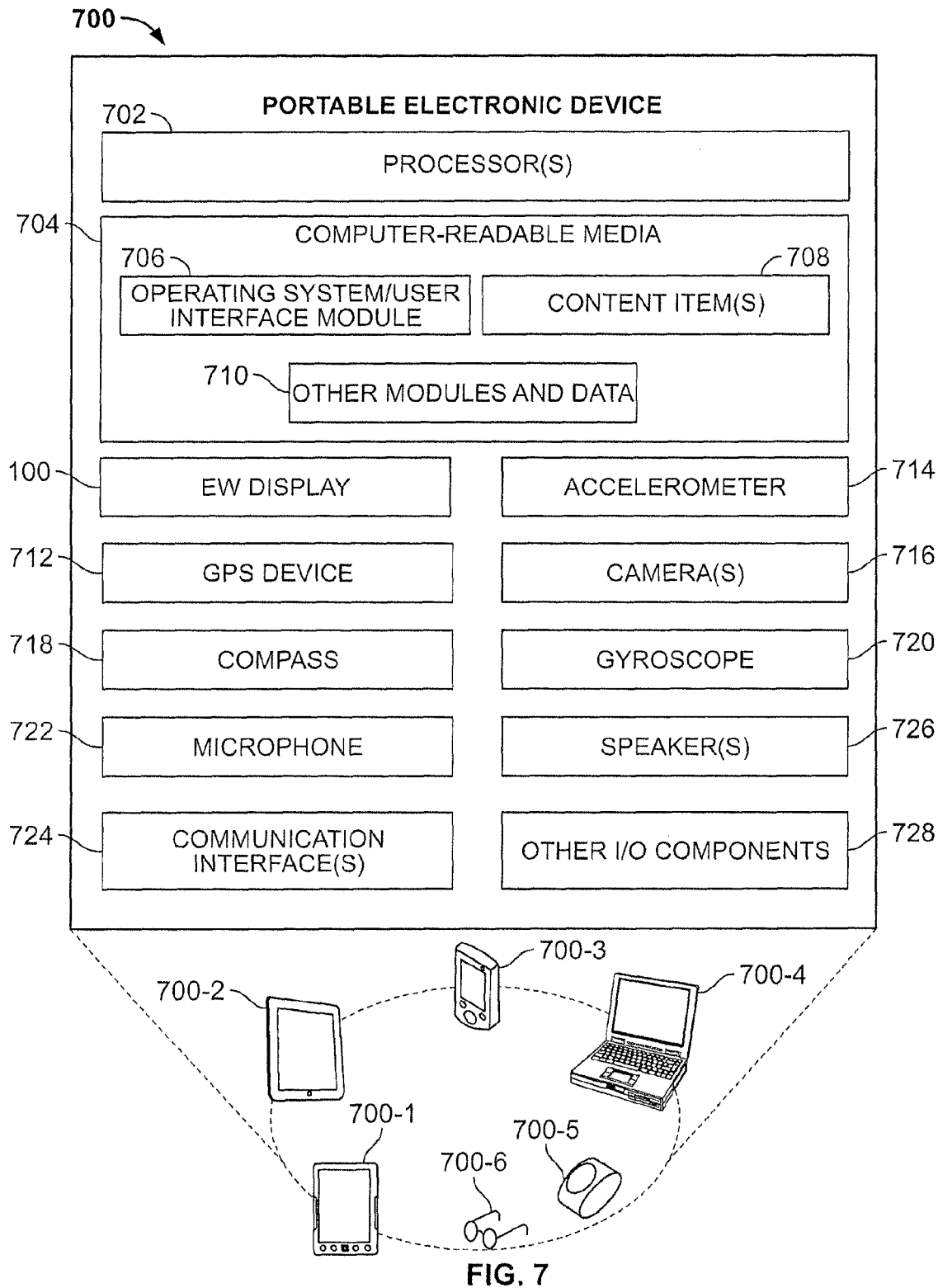
FIG. 7 illustrates select components of an example image display apparatus that may include an electrowetting display, according to various embodiments.

FIG. 7 illustrates select example components of an example image display apparatus 700 that may be used with the electrowetting display device 100 according to some implementations. Other types of displays may also be used with the example image display apparatus 700. Such types of displays include, but are not limited to, LCDs, cholesteric displays, electrophoretic displays, electrofluidic pixel displays, photonic ink displays, and the like.

The image display apparatus 700 may be implemented as any of a number of different types of electronic devices. Some examples of the image display apparatus 700 may include digital media devices and eBook readers 700-1; tablet computing devices 700-2; smart phones, mobile devices and portable gaming systems 700-3; laptop and netbook computing devices 700-4; wearable computing devices 700-5; augmented reality devices, helmets, goggles or glasses 700-6; and any other device capable of connecting with the electrowetting display device 100 and including a processor and memory for controlling the display according to the techniques described herein.

In a very basic configuration, the image display apparatus 700 includes, or accesses, components such as at least one control logic circuit, central processing unit, or processor 702, and one or more computer-readable media 704. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable instructions stored in the computer-readable media 704 or other computer-readable media. The processor 702 can perform one or more of the functions attributed to the timing controller 102, the source driver 104, and/or the gate driver 106 of the electrowetting display device 100. The processor 702 can also perform one or more functions attributed to a graphic controller (not illustrated) for the electrowetting display device.

Depending on the configuration of the image display apparatus 700, the computer-readable media 704 may be an example of tangible non-transitory computer storage media and may include volatile and nonvolatile memory and/or removable and non-removable media implemented in any type of technology for storage of information such as computer-readable instructions, data structures, program modules or other data. The computer-readable media 704 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, the image display apparatus 700 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules or components that may be executed by the processor 702.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the image display apparatus 700. Functional components of the image display apparatus 700 stored in the computer-readable media 704 may include the operating system and user interface module 706 for controlling and managing various functions of the image display apparatus 700, and for generating one or more user interfaces on the electrowetting display device 100 of the image display apparatus 700.

In addition, the computer-readable media 704 may also store data, data structures and the like, that are used by the functional components. For example, data stored by the computer-readable media 704 may include user information and, optionally, one or more content items 708. Depending on the type of the image display apparatus 700, the computer-readable media 704 may also optionally include other functional components and data, such as other modules and data 710, which may include programs, drivers and so forth, and the data used by the functional components. Further, the image display apparatus 700 may include many other logical, programmatic and physical components, of which those described are merely examples that are related to the discussion herein. Further, while the figures illustrate the functional components and data of the image display apparatus 700 as being present on the image display apparatus 700 and executed by the processor 702 on the image display apparatus 700, it is to be appreciated that these components and/or data may be distributed across different computing devices and locations in any manner.

FIG. 7 further illustrates examples of other components that may be included in the image display apparatus 700. Such examples include various types of sensors, which may include a GPS device 712, an accelerometer 714, one or more cameras 716, a compass 718, a gyroscope 720, a microphone 722, and so forth.

The image display apparatus 700 may further include one or more communication interfaces 724, which may support both wired and wireless connection to various networks, such as cellular networks, radio, Wi-Fi networks, close-range wireless connections, near-field connections, infrared signals, local area networks, wide area networks, the Internet, and so forth. The communication interfaces 724 may further allow a user to access storage on or through another device, such as a remote computing device, a network attached storage device, cloud storage, or the like.

The image display apparatus 700 may further be equipped with one or more speakers 726 and various other input/output (I/O) components 728. Such I/O components 728 may include a touchscreen and various user controls (e.g., buttons, a joystick, a keyboard, a keypad, etc.), a haptic or tactile output device, connection ports, physical condition sensors, and so forth. For example, the operating system 706 of the image display apparatus 700 may include suitable drivers configured to accept input from a keypad, keyboard, or other user controls and devices included as the I/O components 728. Additionally, the image display apparatus 700 may include various other components that are not shown, examples of which include removable storage, a power source, such as a battery and power control unit, a PC Card component, and so forth.

In various embodiments, an electrowetting display device includes a first substrate and a second substrate opposite to the first substrate, a pixel between the first substrate and the second substrate, and an oil and an electrolyte solution between the first substrate and the second substrate in the pixel. The electrowetting display device includes a thin film transistor for applying a driving voltage to a capacitor located in the pixel to cause displacement of the oil. A luminance of the pixel decreases at a luminance reduction rate after the driving voltage is applied to the capacitor. The electrowetting display device includes a front light configured to illuminate at least a portion of the pixel, and a timing controller configured to reset the pixel, and increase an output luminance of the front light at a rate inversely proportional the luminance reduction rate of the pixel to compensate for a reduction in a luminance of the pixel of the electrowetting display device caused by a backflow of the oil in the pixel, a current leakage of the capacitor in the pixel, or the timing controller resetting the pixel.

In another embodiment, a device includes a first substrate and a second substrate opposite to the first substrate, a pixel region on the first substrate, and an input line for applying a driving voltage to a capacitor associated with the pixel region to control a luminance of the pixel region. After the driving voltage is applied to the capacitor, the pixel region exhibits a reduction in a luminance of the pixel region over time. The device includes an illumination device configured to illuminate at least a portion of the pixel region, and a timing controller configured to modify an output of the illumination device to compensate for the reduction in the luminance of the pixel region over time.

In another embodiment, a method includes applying a driving voltage to a capacitor associated with a pixel region of an electrowetting display device to cause a displacement of a first fluid in the pixel region. After the driving voltage is applied to the capacitor, the pixel region exhibits a reduction in a luminance of the pixel region over time. The method includes modifying an output of an illumination device of the electrowetting display device to compensate for the reduction in the luminance of the pixel region over time.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device, comprising:
   a first substrate and a second substrate opposite to the first substrate;
   a pixel between the first substrate and the second substrate;
   an oil and an electrolyte solution between the first substrate and the second substrate in the pixel;
   a thin film transistor for applying a driving voltage to a capacitor located in the pixel to cause displacement of the oil, a luminance of the pixel decreasing at a luminance reduction rate after the driving voltage is applied to the capacitor;
   a front light configured to illuminate at least a portion of the pixel; and
   a timing controller configured to:
      reset the pixel, and
      increase an output luminance of the front light at a rate inversely proportional the luminance reduction rate of the pixel to compensate for a reduction in a luminance of the pixel of the electrowetting display device caused by a backflow of the oil in the pixel, a current leakage of the capacitor in the pixel, or the timing controller resetting the pixel.

2. The electrowetting display device of claim 1, further comprising a sensor configured to detect an intensity of ambient light striking a surface of the electrowetting display device and wherein the timing controller is configured to increase the output luminance of the front light by an amount multiplied by a compensation factor, the compensation factor being determined by the intensity of ambient light.

3. The electrowetting display device of claim 1, wherein the front light includes a pulse width modulated power supply and the timing controller is configured to modify the output luminance of the front light by increasing a duty cycle of the pulse width modulated power supply to increase the output luminance of the front light.

4. The electrowetting display device of claim 1, wherein the timing controller is configured to modify the output luminance of the front light in each addressing period of the timing controller.

5. A device, comprising:
   a first substrate and a second substrate opposite to the first substrate;
   a pixel region on the first substrate;
   an input line for applying a driving voltage to a capacitor associated with the pixel region to control a luminance of the pixel region, wherein, after the driving voltage is applied to the capacitor, the pixel region exhibits a reduction in a luminance of the pixel region over time;
   an illumination device configured to illuminate at least a portion of the pixel region; and
   a timing controller configured to modify an output of the illumination device to compensate for the reduction in the luminance of the pixel region over time,
   wherein the timing controller is configured to reset the pixel region, and modify the output of the illumination device to compensate for changes in the luminance of the pixel region caused by the timing controller resetting the pixel region.

6. The device of claim 5, wherein the timing controller is configured to reset the pixel region at a frequency of less than 10 Hertz.

7. The device of claim 5, wherein a luminance of the pixel region decreases at a luminance reduction rate after the driving voltage is applied to the capacitor and the timing controller is configured to increase the output of the illumination device at a rate inversely proportional the luminance reduction rate to compensate for the reduction in the luminance of the pixel region over time.

8. The device of claim 5, further comprising a sensor configured to detect an intensity of ambient light and wherein the timing controller is configured to modify the output of the illumination device at least partially based upon the intensity of ambient light.

9. The device of claim 8, wherein modifying the output of the illumination device at least partially based upon the intensity of ambient light includes increasing the output of the illumination device by an amount multiplied by a compensation factor, the compensation factor being determined by the intensity of ambient light.

10. The device of claim 9, wherein the timing controller is configured to:
determine a nominal output of the illumination device; and
modify an output of the illumination device to compensate for the reduction in the luminance of the pixel region over time by increasing the output of the illumination device above the nominal output.

11. The device of claim 10, wherein the nominal output of the illumination device is determined by a user setting.

12. The device of claim 5, wherein the illumination device includes a pulse width modulated power supply and the timing controller is configured to increase the output of the illumination device by increasing a duty cycle of the pulse width modulated power supply.

13. The device of claim 5, wherein the illumination device includes a front light of the device or a back light of the device.

14. The device of claim 5, wherein the timing controller is configured to modify the output of the illumination device to compensate for the reduction in the luminance of the pixel region over time by changing the output of the illumination device in each addressing period of the timing controller.

15. A method, comprising:
applying a driving voltage to a capacitor associated with a pixel region of an electrowetting display device to cause a displacement of a first fluid in the pixel region, wherein, after the driving voltage is applied to the capacitor, the pixel region exhibits a reduction in a luminance of the pixel region over time;
determining a nominal output of the illumination device; and
modifying an output of an illumination device of the electrowetting display device to compensate for the reduction in the luminance of the pixel region over time, wherein the output of the illumination device is increased above the nominal output.

16. The method of claim 15, further comprising:
resetting the pixel region, and
wherein modulating the output of the illumination device includes modulating the output of the illumination device to compensate for changes in the luminance of the pixel region caused by resetting the pixel region.

17. The method of claim 16, wherein a luminance of the pixel region decreases at a luminance reduction rate after the driving voltage is applied to the capacitor and wherein modifying the output of the illumination device includes increasing the output of the illumination device at a rate inversely proportional to the luminance reduction rate to compensate for the reduction in the luminance of the pixel region over time.

18. The method of claim 15, wherein the nominal output of the illumination device is determined by a user setting.

19. A device, comprising:
a first substrate and a second substrate opposite to the first substrate;
a pixel region on the first substrate;
an input line for applying a driving voltage to a capacitor associated with the pixel region to control a luminance of the pixel region, wherein, after the driving voltage is applied to the capacitor, the pixel region exhibits a reduction in a luminance of the pixel region over time;
an illumination device configured to illuminate at least a portion of the pixel region; and
a timing controller configured to modify an output of the illumination device to compensate for the reduction in the luminance of the pixel region over time, wherein the luminance of the pixel region decreases at a luminance reduction rate after the driving voltage is applied to the capacitor and the timing controller is configured to increase the output of the illumination device at a rate inversely proportional the luminance reduction rate to compensate for the reduction in the luminance of the pixel region over time.

* * * * *